US009521662B2

(12) United States Patent
Bertrand et al.

(10) Patent No.: US 9,521,662 B2
(45) Date of Patent: *Dec. 13, 2016

(54) UPLINK SYNCHRONIZATION MANAGEMENT IN WIRELESS NETWORKS

(71) Applicant: TEXAS INSTRUMENTS INCORPORATED, Dallas, TX (US)

(72) Inventors: Pierre Bertrand, Antibes (FR); Shantanu Kangude, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/245,837

(22) Filed: Apr. 4, 2014

(65) Prior Publication Data

US 2014/0219173 A1 Aug. 7, 2014

Related U.S. Application Data

(63) Continuation of application No. 11/858,860, filed on Sep. 20, 2007, now Pat. No. 8,711,765.

(30) Foreign Application Priority Data

Sep. 27, 2006 (EP) .................... 06291535

(51) Int. Cl.
*H04W 4/00* (2009.01)
*H04W 72/04* (2009.01)
(Continued)

(52) U.S. Cl.
CPC ..... *H04W 72/0413* (2013.01); *H04W 56/0005* (2013.01); *H04W 72/085* (2013.01);
(Continued)

(58) Field of Classification Search
USPC .............. 370/328–336, 344–350, 208–210; 455/522–574
See application file for complete search history.

(56) References Cited

U.S. PATENT DOCUMENTS 7,342,939 B2   3/2008  Jhamnani et al.
7,738,429 B2 * 6/2010  Luo et al. .................... 370/335
(Continued)

FOREIGN PATENT DOCUMENTS

WO      2007147808      12/2007

OTHER PUBLICATIONS

R1-061228, "On the Period of L1 Synchronization RACH", Nortel Networks; Found at; http://www.3gpp.org/ftp/tsg_ran/wg1_rl1/TSGR1_45/Docs/.
(Continued)

*Primary Examiner* — Man Phan
(74) *Attorney, Agent, or Firm* — Ronald O. Neerings; Charles A. Brill; Frank D. Cimino

(57) ABSTRACT

In at least some embodiments, a wireless networking system is provided. The wireless networking system includes a base-station and a plurality of user devices in communication with the base-station. The base-station selectively assigns each user device to one of a first group and a second group. Also, the base-station selectively assigns each user device to an uplink synchronized state and an uplink non-synchronized state. The base-station allocates a unique reduced identifier to each user device in the uplink synchronized state, but does not allocate unique reduced identifiers to user devices in the non-synchronized state.

23 Claims, 4 Drawing Sheets

(51) Int. Cl.
*H04W 74/04* (2009.01)
*H04W 56/00* (2009.01)
*H04W 72/08* (2009.01)
*H04W 72/12* (2009.01)
*H04W 74/08* (2009.01)

(52) U.S. Cl.
CPC ......... *H04W 72/087* (2013.01); *H04W 74/04* (2013.01); *H04W 72/12* (2013.01); *H04W 74/0875* (2013.01)

(56) References Cited

U.S. PATENT DOCUMENTS

| | | | |
|---|---|---|---|
| 7,778,151 B2* | 8/2010 | Bertrand et al. | 370/208 |
| 8,050,250 B2* | 11/2011 | Zhang et al. | 370/350 |
| 8,059,524 B2* | 11/2011 | Bertrand et al. | 370/203 |
| 2006/0120321 A1* | 6/2006 | Gerkis et al. | 370/329 |
| 2007/0121542 A1 | 5/2007 | Lohr et al. | |
| 2007/0129075 A1* | 6/2007 | Kim et al. | 455/436 |
| 2008/0004058 A1 | 1/2008 | Jeong et al. | |
| 2008/0267105 A1 | 10/2008 | Wang et al. | |
| 2008/0267165 A1 | 10/2008 | Bertrand et al. | |
| 2008/0291878 A1* | 11/2008 | Zhang et al. | 370/336 |
| 2008/0310396 A1 | 12/2008 | Park et al. | |
| 2009/0040918 A1 | 2/2009 | Jiang et al. | |
| 2009/0103482 A1 | 4/2009 | Imamura et al. | |
| 2009/0116434 A1 | 5/2009 | Lohr et al. | |
| 2009/0239568 A1 | 9/2009 | Bertrand et al. | |
| 2009/0279495 A1 | 11/2009 | Yoo | |
| 2010/0002638 A1 | 1/2010 | Park et al. | |
| 2010/0020786 A1* | 1/2010 | Futaki et al. | 370/350 |
| 2010/0034155 A1 | 2/2010 | Noh et al. | |
| 2010/0067497 A1* | 3/2010 | Chmiel et al. | 370/336 |
| 2010/0098051 A1 | 4/2010 | Uemura | |
| 2010/0182992 A1 | 7/2010 | Chun et al. | |
| 2010/0278143 A1* | 11/2010 | Chun et al. | 370/331 |
| 2011/0194432 A1* | 8/2011 | Kato et al. | 370/252 |
| 2012/0063393 A1* | 3/2012 | Du et al. | 370/329 |

OTHER PUBLICATIONS

R1-062014, "Uplink Reference Signal Design in EUTRA", Texas Instruments; Found at: http://ww.3gpp.org/ftp/TSG_RAN/WG1_RL1/TSGR1_46/Docs/.

R1-062051, "UE MAC ID and 1.1 TrCH Multiplexing for E-UTRA", Qualcomm Europe; Found at: http://ww.3gpp.org/ftp/TSG_RAN/WG1_RL1/TSGR1_46/Docs/.

R1-062257, "Short UE Identity for Downlink Scheduling Information", Sharp; Found at: http://www.3gpp.org/ftp/TSG_RAN/WG1_RL1/TSGR1_46/Docs/.

R1-062359, "Size of UE ID for Resource Grant", Nokia; Found at: http://www.3gpp.org/ftp/TSG_RAN/WG1_R1/TSGR1_46/Docs/.

R1-062412, "TR25.814 CR: DL and UL VoIP Capacity Characterization for E-UTRA", Qualcomm Europe, Motorola, ' Panasonic; Found at: http://www.3gpp.org/ftp/TSG_RAN/WG1_RL1/TSGR1_46/Docs/.

"E-UTRA; Radio Interface Protocol Aspects", 3GPP TR25.813, v7.0.0; Found at: http://www.3gpp.org/ftp/Specs/archive/25%5Fseries/25.813/.

"Physical Layer Aspects for Evolved UTRA", 3GPP TR25.814, v7.0.0; Found at: http://www.3gpp.org/ftp/Specs/archive/25%5Fseries/25.814/.

* cited by examiner

UPLINK SYNCHRONIZATION MANAGEMENT IN WIRELESS NETWORKS

CROSS-REFERENCE TO RELATED APPLICATIONS

This application is a Continuation of application Ser. No. 11/858,860 filed Sep. 20, 2007, which claims priority to EP Patent Application No. 06291535.0, entitled "REDUCED L1 IDENTIFIER FOR UL SYNCHRONIZED UE'S IN E-UTRAN", filed Sep. 27, 2006. The above-referenced application is incorporated herein by reference.

FIELD OF THE INVENTION

The present disclosure is directed to wireless communication systems, and more particularly, but not by way of limitation, to Long Term Evolution (LTE) wireless networks.

BACKGROUND

Long Term Evolution (LTE) wireless networks also known as Enhanced Universal Terrestrial Radio Access Network (E-UTRAN) networks are being standardized by Third Generation Partners Project (3GPP) working groups. For E-UTRAN networks, Orthogonal Frequency Division Multiple Access (OFDMA) is associated with downlink communications and Single-Carrier Frequency Division Multiple Access (SC-FDMA) is associated with uplink communications. User equipments (UEs) of an E-UTRAN network are time and frequency multiplexed on a shared channel such that time and frequency synchronization are required.

The scheduler, in the base-station, has full control of the time and frequency locations of uplink transmissions for all connected user devices, except for UE autonomous transmissions through either the non-synchronized random access channel or the scheduling request channel. To enable proper scheduling and multi-UE management, each UE should be uniquely identified to a base-station. The 3GPP working groups have proposed a 16-bit identifier (ID) for UE's, which represents significant overhead costs for uplink and downlink control signaling in an E-UTRAN network because, in practical implementations, at most a few hundred UE's (compared to $2^{16}$) will be maintained in uplink synchronization. An uplink synchronized UE can request and have access to uplink transmissions faster than a non-synchronized UE, which first needs to recover synchronization.

SUMMARY

In at least some embodiments, a wireless networking system is provided. The wireless networking system comprises a base-station and a plurality of user devices in communication with the base-station. The base-station selectively assigns each user device to one of a first group and a second group. Also, the base-station selectively assigns each user device to an uplink synchronized state and an uplink non-synchronized state. The base-station allocates a unique reduced identifier to each user device in the uplink synchronized state, but does not allocate unique reduced identifiers to user devices in the non-synchronized state.

In at least some embodiments, a method is provided. The method comprises receiving uplink resource requests from a plurality of user devices of a wireless network, each of the resource requests indicating a priority level. The method further comprises assigning the user devices to one of a first group and a second group based on the priority levels. The method further comprises managing uplink synchronization states of the user devices based on timers that track an amount of time that passes since at least one of a preceding uplink transmission and a preceding received timing adjustment command and based on scheduling requests received via a non-synchronized random access (NSRA) channel. The method further comprises allocating a unique reduced identifier to each user device of the first group, but not to user devices of the second group.

BRIEF DESCRIPTION OF THE DRAWINGS

For a detailed description of various embodiments of the invention, reference will now be made to the accompanying drawings in which.

NOTATION AND NOMENCLATURE

Figure 1:
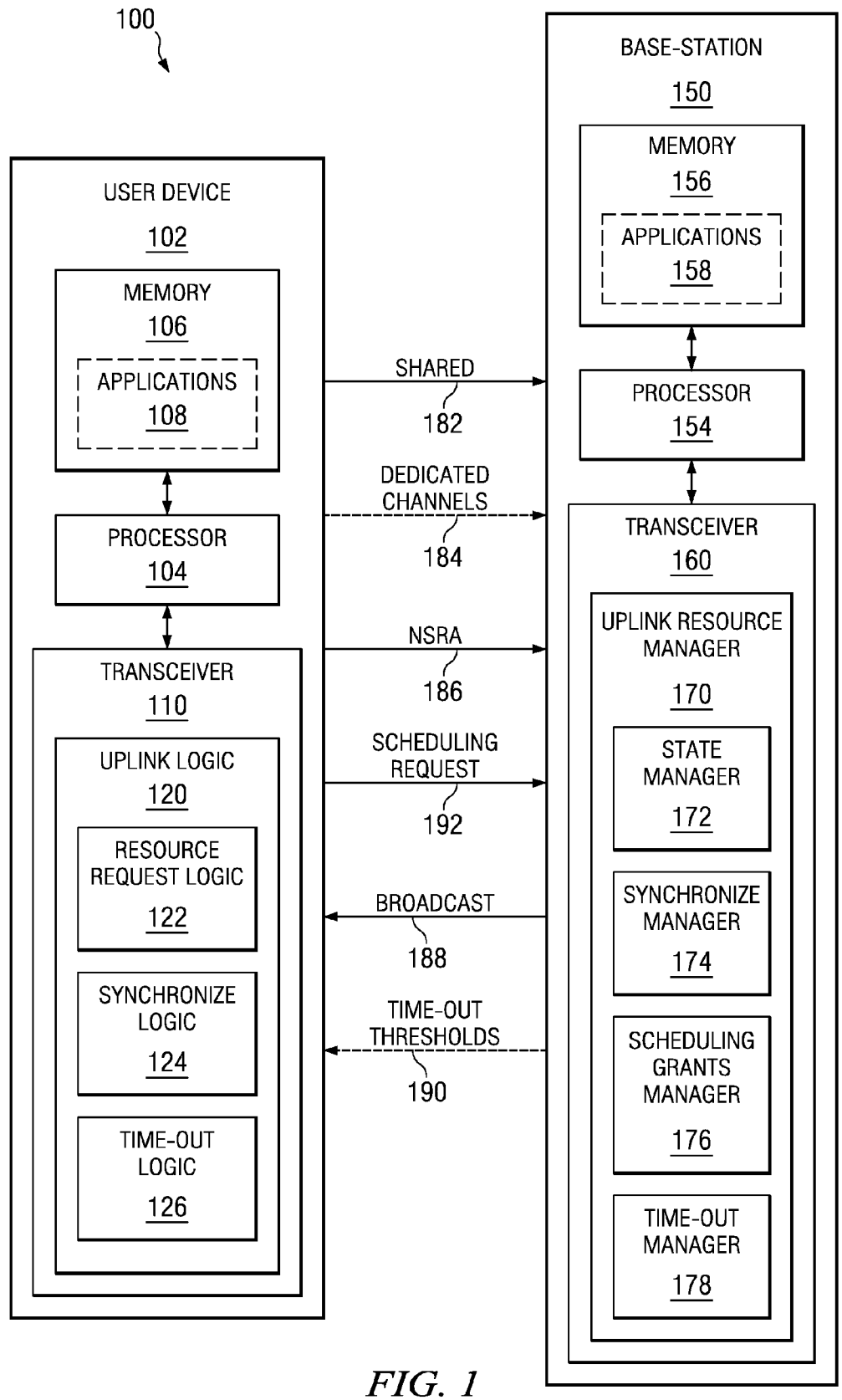
FIG. 1 illustrates a wireless networking system in accordance with embodiments of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure relate to methods and systems for managing a wireless communication network. Although Long Term Evolution (LTE) wireless networks also known as Enhanced Universal Terrestrial Radio Access Network (E-UTRAN) networks are mentioned herein, the methods and systems could be used with other networks as well. As described herein, embodiments reduce control overhead costs by letting user devices (sometimes referred to as user equipments (UES)) be in two possible states referred to as the "uplink synchronized state" and the "uplink non-synchronized state". Each user device in the uplink synchronized state is allocated uplink resources of a base-station and is assigned, on top of its RRC/MAC 16-bit identifier (C-RNTI), a unique uplink physical layer identifier to temporarily ensure non-contentious uplink transmissions via a shared communication channel or a scheduling request channel.

The group of user devices in the uplink non-synchronized state are not assigned any additional physical layer identifier and thus the total number of bits needed for the uplink physical layer identifier in the uplink synchronized state can be reduced to improve efficiency of the control signaling scheme. In at least some embodiments, each user device in the uplink non-synchronized state cannot send uplink transmissions until successfully requesting uplink resources and uplink synchronization from the base-station. The uplink synchronized state is hereafter referred to as a "synchronized state" and the uplink non-synchronized state is hereafter referred to as a "non-synchronized state". Also, the unique uplink physical layer identifier is hereafter referred to as a "reduced identifier" or a "unique identifier". Thus, it should be noted that embodiments described by these terms are not limited to uplink synchronization or to unique uplink physical layer identifiers.

In at least some embodiments, the assignment of user devices into the synchronized state and the non-synchronized state is temporary. For example, upon a successful request for uplink resources (also referred to as uplink scheduling grant), a non-synchronized user device can be reassigned to the synchronized state and receives a reduced identifier to enable uplink transmissions and contention-free scheduling requests. On the other hand, if more than a threshold amount of time passes without an uplink transmission or a timing adjustment (TA) command from the base-station, a user device in the synchronized state can be reassigned to the non-synchronized state and the reduced identifier corresponding to the reassigned user device is released.

FIG. 1 illustrates a wireless networking system 100 in accordance with embodiments of the disclosure. As shown in FIG. 1, the wireless networking system 100 comprises a user device 102 in communication with a base-station 150. The user device 102 may represent any of a variety of devices such as a server, a desktop computer, a laptop computer, a cellular phone, a Personal Digital Assistant (PDA), a smart phone or other electronic devices. In some embodiments, the electronic device 102 communicates with the base-station 150 based on a LTE or E-UTRAN protocol. Alternatively, another communication protocol now known or later developed is used.

As shown, the electronic device 102 comprises a processor 104 coupled to a memory 106 and a transceiver 110. The memory 106 stores applications 108 for execution by the processor 104. The applications 108 could comprise any known or future application useful for individuals or organizations. As an example, such applications 108 could be categorized as operating systems, device drivers, databases, multimedia tools, presentation tools, Internet browsers, emailers, Voice Over Internet Protocol (VOIP) tools, file browsers, firewalls, instant messaging, finance tools, games, word processors or other categories. Regardless of the exact nature of the applications 108, at least some of the applications 108 may direct the user device 102 to transmit uplink signals to the base-station 150 periodically or continuously via the transceiver 110. Over time, different uplink transmissions from the user device 102 may be high priority (time-critical) or low priority (non-time critical). In at least some embodiments, the user device 102 identifies a Quality of Service (QoS) requirement when requesting an uplink resource from the base-station 150. In some cases, the QoS requirement may be implicitly derived by the base-station 150 from the type of traffic supported by the user device 102. As an example, VOIP and gaming applications often involve high priority uplink transmissions while High Throughput (HTP)/Hypertext Transmission Protocol (HTTP) traffic involves low priority uplink transmissions.

As shown in FIG. 1, the transceiver 110 comprises uplink logic 120, which enables the user device 102 to request an uplink resource from the base-station 150 and upon a successful request to send uplink transmissions to the base-station 150. In FIG. 1, the uplink logic 120 comprises resource request logic 122, synchronize logic 124, and time-out logic 126. As would be understood by one of skill in the art, the components of the uplink logic 120 may involve the physical (PHY) layer and/or the Media Access Control (MAC) layer of the transceiver 110.

In at least some embodiments, the resource request logic 122 detects when the user device 102, in absence of any valid uplink resource grant, needs to send an uplink transmission to the base-station 150 and submits a corresponding scheduling request. As previously mentioned, the request may indicate a priority level or QoS requirement for the uplink transmission. If the user device 102 is not uplink synchronized, the scheduling request is made using non-synchronized random access (NSRA) 186, which is potentially contentious depending on how many other user devices also need to use the NSRA at the same time (e.g., for scheduling requests or uplink synchronization maintenance). Alternatively, if the user device 102 is uplink synchronized, the resource request may be submitted via a contention-free scheduling request channel 192 which may be available to the user device 102.

In at least some embodiments, the scheduling request channel 192 is part of the dedicated channels 184. The dedicated channels 184 represent uplink synchronized channels which are dedicated to a particular purpose and which are selectively accessible to one or more user devices. Another example of dedicated channel is the sounding reference signal (SRS). The SRS is a standalone reference signal (or pilot) which provides means to the base-station to perform channel quality information (CQI) estimation for frequency dependent scheduling, to maintain uplink synchronization, and to implement link adaptation and power control for each user.

If the user device 102 previously obtained a resource allocation from the base-station 150 and the resource allocation has not expired, uplink transmissions can be sent via a shared channel 182 (i.e., a channel shared with other user devices based on time and division multiplexing) in the form of a MAC Packet Data Unit (PDU) transmission. In at least some embodiments, the resource request logic 122 also detects when the user device 102, with at least one valid uplink resource grant, needs to update its current allocated uplink resource(s) (e.g., if the user device 102 needs more resources because it received more data in its transmission buffer) and submits a corresponding scheduling request. Since the user device 102 already has valid uplink grants, it is uplink synchronized, and the resource request may be either embedded in a MAC PDU sent on these valid grants on the uplink shared channel 182, or submitted via the scheduling request channel 192.

To use the shared channel 182 or the scheduling request channel 192, the user device 102 receives a unique identifier from the base-station 150. In some embodiments, the unique identifier is explicitly provided by the base-station 150 (e.g., the base-station 150 broadcasts a multi-bit unique identifier to the user device 102 for use with the shared channel 182). In alternative embodiments, the unique identifier is implicitly provided by the base-station 150 (e.g., the base-station 150 provides a one-to-one mapping between the user device 102 and a physical uplink resource of the scheduling request channel 192).

The synchronize logic 124 enables the user device 102 to maintain a particular synchronization for uplink transmissions via the shared channel 182 or other uplink synchronized channels (e.g., the SRS or the scheduling request channel 192). In some embodiments, the synchronize logic 124 supports time and frequency adjustments based on a predetermined protocol and/or instructions from the base-station 150. Once the user device 102 is synchronized, the synchronization can be periodically updated based on timers and/or information exchanged between the user device 102 and the base-station 150. For example, if the user device 102 is synchronized and has at least one scheduling grant from the base-station 150, then the synchronize manager 174 of the base-station 150 can maintain the user device's synchronization based on ongoing uplink transmissions from the user device 102 via the shared channel 182.

If the user device 102 is synchronized but does not have a scheduling grant from the base-station 150, then the synchronize manager 174 of the base-station 150 can maintain the user's synchronization based on an NSRA transmission 186. Alternatively, if the user device 102 is synchronized but does not have a scheduling grant from the base-station 150, then the synchronize manager 174 of the base-station 150 can maintain the user's synchronization based on information transmitted via one of the dedicated channels 184 (e.g., using a SRS or an autonomous synchronization request from the user device 102 through the scheduling request channel 192). By appropriately synchronizing uplink transmissions of the user device 102, interference to and from the transmissions of other user devices can be avoided and orthogonal multiplexing is maintained.

As shown in FIG. 1, the base-station 150 comprises a processor 154 coupled to a memory 156 and a transceiver 160. The memory 156 stores applications 158 for execution by the processor 154. The applications 158 could comprise any known or future application useful for managing wireless communications. At least some of the applications 158 may direct the base-station to manage transmissions to or from the user device 102.

As shown in FIG. 1, the transceiver 160 comprises an uplink resource manager 170, which enables the base-station 150 to selectively allocate uplink resources to the user device 102. In FIG. 1, the uplink resource manager 170 comprises a state manager 172, a synchronize manager 174, a scheduling grants manager 176 and a time-out manager 178. As would be understood by one of skill in the art, the components of the uplink resource manager 170 may involve the physical (PHY) layer and/or the Media Access Control (MAC) layer of the transceiver 160.

In at least some embodiments, the state manager 172 determines whether to assign the user device 102 to a synchronized state or to a non-synchronized state. In at least some embodiments, the user device 102 can request to be assigned to the synchronized state using NSRA 186.

If the user device 102 is accepted into the synchronized state, a reduced identifier is provided to the user device 102. The reduced identifier enables the user device 102 to send uplink transmissions via the shared channel 182 and new resource requests via the scheduling requests channel 192. In some embodiments, the state manager 172 enables the reduced identifier to be explicitly provided to the user device 102 (e.g., broadcasting a multi-bit unique identifier to the user device 102 for use with the shared channel 182). In alternative embodiments, the state manager 172 enables the unique identifier to be implicitly provided to the user device 102 (e.g., providing a one-to-one mapping between the user device 102 and a physical uplink resource of the base-station 150). If the user device 102 becomes non-synchronized due to a time-out or any other reason, the state manager 172 reassigns the user device 102 to the non-synchronized state and releases the reduced identifier and any associated uplink resource that was assigned to the user device 102.

The synchronize manager 174 maintains user devices in synchronization for uplink transmissions via the shared channel 182 or any dedicated channel 184. In order to do so, the synchronize manager 174 estimates the timing error of the uplink transmissions of the user device 102 on either the shared channel 182, a dedicated channel 184 (e.g., SRS) or the NSRA 186. Then, the synchronize manager 174 sends back a timing advance (TA) command to the user device 102, that will be executed by the synchronize logic 124. By appropriately synchronizing uplink transmissions of the user device 102, the synchronize manager 174 avoids interferences between uplink transmissions of the user device 102 and uplink transmissions of other user devices and orthogonal multiplexing is maintained.

The scheduling grants manager 176 selectively determines when synchronized user devices will be scheduled on the shared channel 182. For example, the scheduling grants manager 176 may assign scheduling grants in response to new resource requests from user device 102 sent through the scheduling request channel 192.

If more than a threshold amount of time passes during which the user device 102 does not send any uplink transmissions, a time-out may occur. The time-out manager 178 determines when a time-out occurs based on one or more time-out thresholds 190. In at least some embodiments, the time-out manager 178 implements timers or counters to track the amount of time that passes between uplink transmissions for all synchronized user devices. The time-out thresholds 190 may be predetermined or may be determined, for example, based on the number of user devices in communication with the base-station.

In at least some embodiments, a time-out threshold causes user devices to enter the non-synchronized state. Preferably, the entrance of user devices to the non-synchronized state does not depend on exchanging messages between the base-station 150 and user devices. In other words, both user devices and the base-station 150 can track the passage of time separately and independently determine that a user device is in a non-synchronized state. In case a user device transitions to the non-synchronized state, any existing uplink grant of this user device is released.

Figure 2:
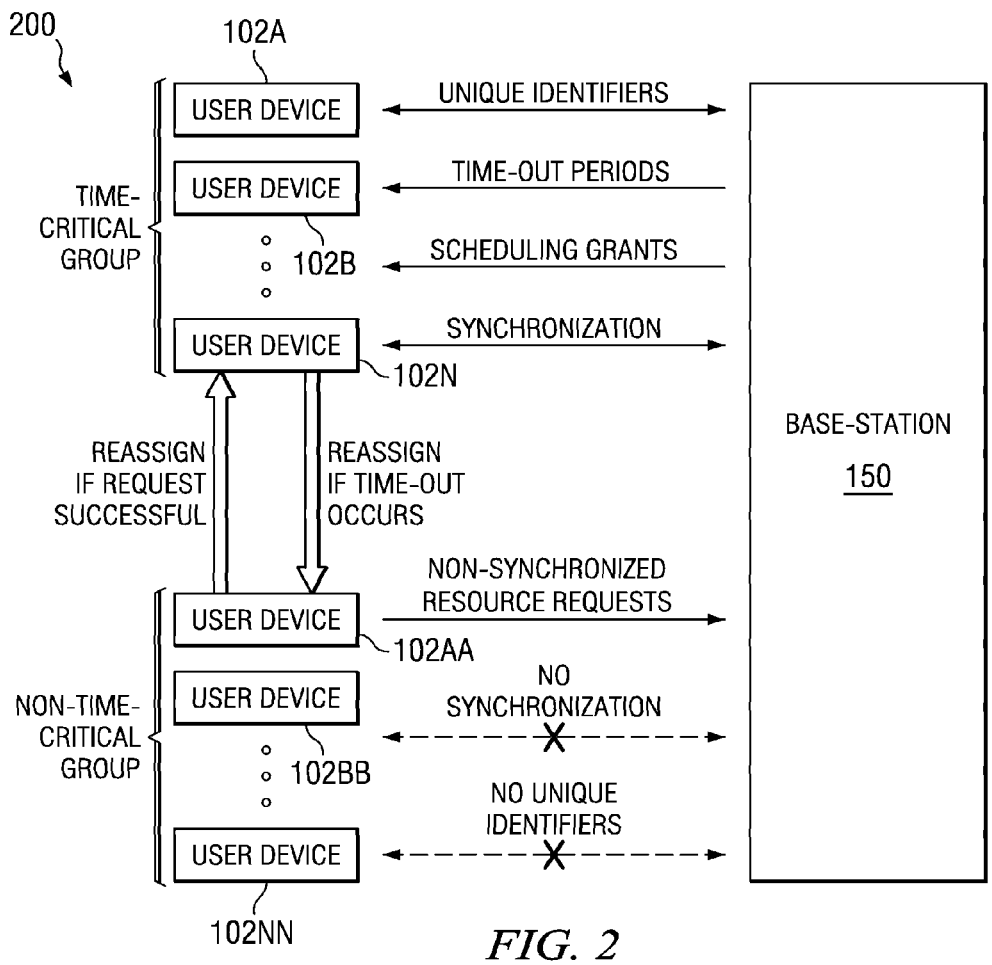
FIG. 2 illustrates a wireless networking system in accordance with embodiments of the disclosure.

FIG. 2 illustrates a wireless networking system 200 in accordance with embodiments of the disclosure. As shown in FIG. 2, the base-station 150 discussed previously can support a plurality of user devices. Some user devices 102A-102N have been assigned to a "time-critical group" and other user devices 102AA-102NN have been assigned to a "non-time-critical group". The groupings can be based on information (e.g., a QoS requirement) provided with resource requests. A lack of information could also determine which group (e.g., the default group when insufficient information is provided could be the non-time-critical group). As shown, the user devices may be reassigned from the time-critical group to the non-time-critical group and vice versa. For example, a given user device in the time-critical group could be reassigned to the non-time-critical group if a time-out occurs. Meanwhile, a given user device in the non-time-critical group could be reassigned to the time-critical group if a resource request is successful.

As shown in FIG. 2, the uplink synchronized state involves reduced identifiers (for use with a shared or dedicated channel), time-out periods (e.g., scheduling grant expiration and time until non-synchronization), scheduling grants, and periodic synchronization for uplink transmissions. Meanwhile, the non-synchronized state does not involve synchronization or reduced identifiers. Thus, the total number of bits needed for the reduced identifiers of the synchronized state can be reduced to improve efficiency of the control signaling scheme. As an example, the Cell Radio Network Temporary Identifier (C-RNTI) proposed for LTE or E-UTRAN networks has 16-bits. Rather than use 16-bits for the unique identifier, embodiments select the number of bits used for the unique identifiers based on a maximum number of uplink synchronized user devices to be supported by the base-station 150.

For example, if the base-station 150 supports 512 uplink synchronized user devices (e.g., in a 5 MHZ band), then a 9-bit identifier would enable each user device to be uniquely identified. Alternatively, if the base-station 150 supports 1024 user devices (e.g., in a 10 MHZ band), a 10-bit identifier would enable each user device to be uniquely identified. Alternatively, if the base-station 150 supports 2048 user devices (e.g., in a 20 MHZ band), an 11-bit identifier would enable each user device to be uniquely identified. Any of these options (or others), would reduce the number of bits from 16-bits and improve efficiency of the control signal overhead. Assuming 11-bits are selected, at least 30-bits would be saved for each downlink control message per Transition Time Interval (TTI).

Figure 3:
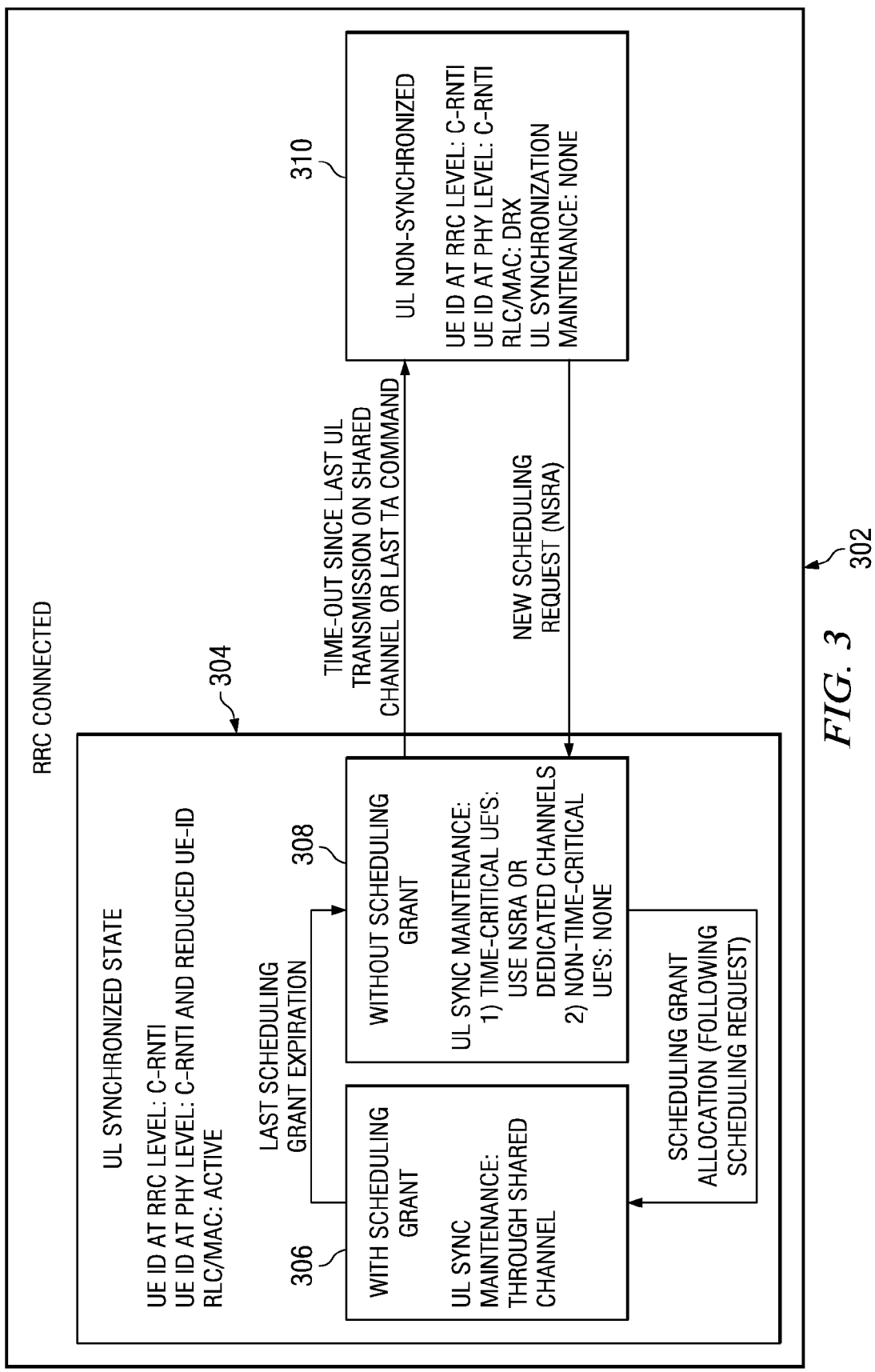
FIG. 3 illustrates a block diagram showing states of a wireless networking system in accordance with embodiments of the disclosure.

FIG. 3 illustrates a block diagram showing states of a wireless networking system in accordance with embodiments of the disclosure. The block diagram represents various states of a user device of an LTE or E-UTRAN network. In FIG. 3, a Radio Resource Control (RRC) connected state 302 for a user device is represented. The RRC connected state 302 has an uplink synchronized state 304 and an uplink non-synchronized state 310. The uplink synchronized state 304 indicates that the unique identifier ("UE ID") at the RRC level is C-RTNI and the unique identifier at the PHY level is C-RTNI and a reduced unique identifier (i.e., a unique identifier having less than 16-bits). Also, the Radio Link Control Multiple Access Control (RLC/MAC) in the uplink synchronized state 304 is active.

Within the uplink synchronized state 304, a "with scheduling grant" state 306 and a "without scheduling grant" state 308 is shown. The "with scheduling grant" state 306 indicates that uplink synchronization is maintained though a shared channel (e.g., via ongoing uplink transmissions). The "without scheduling grant" state 308 indicates that uplink synchronization is maintained for time-critical user devices (UE's) using NSRA or dedicated channels such as a SRS or a scheduling request channel. The "without scheduling grant" state 308 also indicates that uplink synchronization is not maintained for non-time-critical user devices (UE's). As shown, a user device in the "with scheduling grant" state 306 proceeds to the "without scheduling grant" state 308 upon expiration of a scheduling grant. Also, a user device in the "without scheduling grant" state 308 proceeds to the "with scheduling grant" state 306 upon allocation of a scheduling grant (e.g., following a new scheduling request through the scheduling request channel).

FIG. 3 also indicates that a user device in the uplink synchronized state 304 proceeds to the uplink non-synchronized state 310 based on a time-out occurring since the last uplink transmission on the shared channel or since the last received timing adjustment (TA) command. The uplink non-synchronized state 310 indicates that the unique identifier ("UE ID") at the RRC and PHY levels is C-RTNI. The Radio Link Control Multiple Access Control (RLC/MAC) in the uplink non-synchronized state 304 is discontinuous reception (DRX). There is no maintenance of uplink synchronization in the uplink non-synchronized state 310. Finally, a user device proceeds from the uplink non-synchronous state 310 to the uplink synchronous state 304 using a new scheduling request. The new scheduling request can only be transmitted using NSRA or a dedicated channel such as SRS or a resource request channel.

Figure 4:
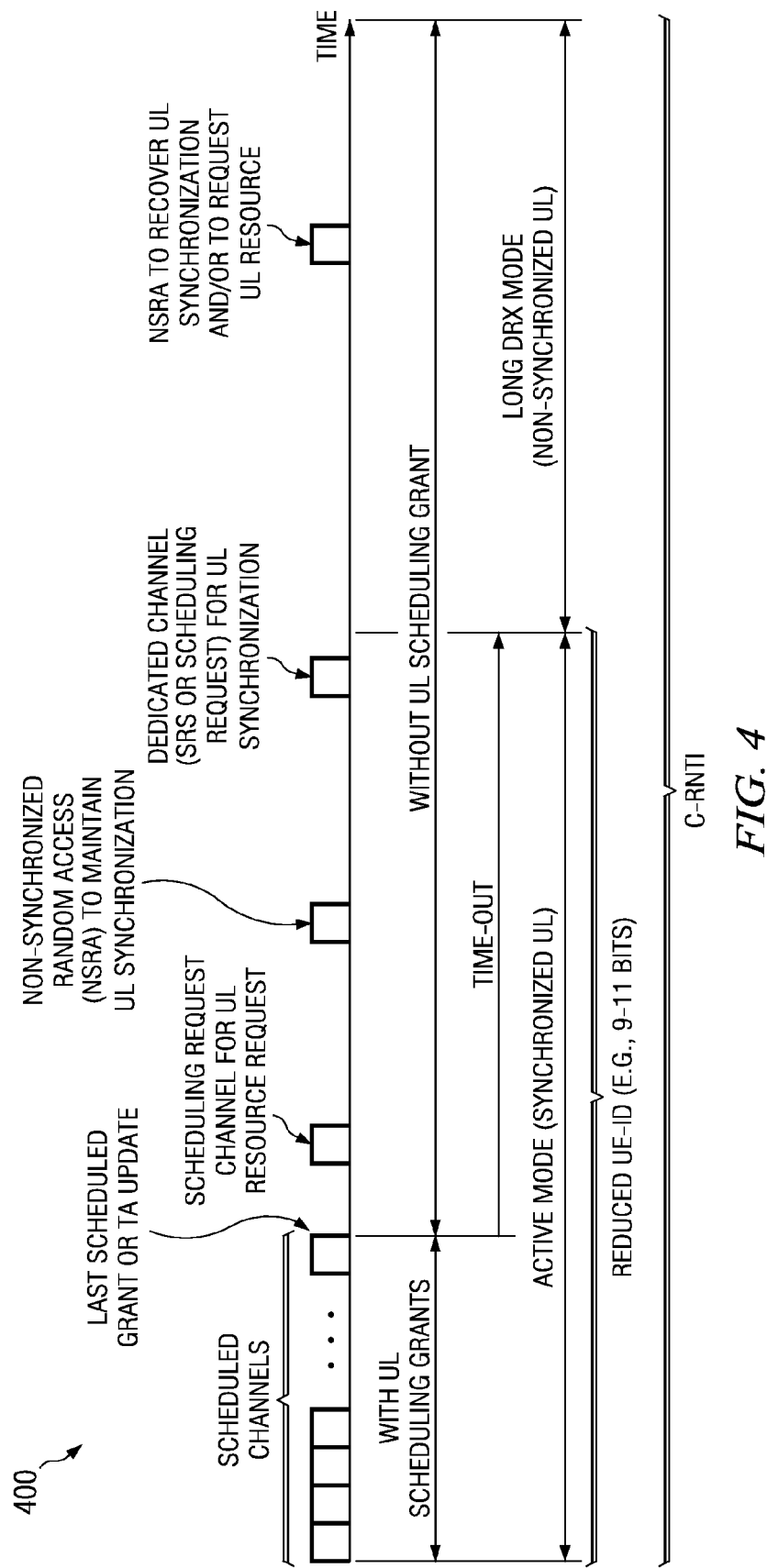
FIG. 4 illustrates a time chart showing features of a wireless networking system in accordance with embodiments of the disclosure.

FIG. 4 illustrates a time chart 400 showing features of a wireless networking system in accordance with embodiments of the disclosure. The time chart represents various features of a LTE or E-UTRAN network in accordance with embodiments. As shown in FIG. 4, a plurality of transmission blocks are shown on a time line. These transmission blocks are associated with a single user device. The transmission blocks on the left of the time line are related to scheduled channels with uplink scheduling grants. These transmission blocks occur during an active mode in which uplink synchronization is achieved. As shown, a reduced identifier (e.g., 9-11 bits) and C-RNTI are used in the active mode.

During the active mode, it may happen that the synchronized device does not have a scheduling grant anymore. During the time-out period, several transmissions blocks are shown although the order may vary. The first transmission block during the time-out period is a scheduling request (SR) transmission for a new uplink resource request. The second transmission block during the time-out period is a NSRA transmission to maintain uplink synchronization. The third transmission block during the time-out period is a dedicated channel transmission (e.g., SRS) to maintain uplink synchronization.

FIG. 4 also shows a non-synchronized mode, also referred to as long DRX mode during which there is no scheduling grant for transmissions. As shown, C-RNTI is used in the long DRX mode and the reduced unique identifier is not used. One transmission block is shown in the long DRX mode. It is a NSRA transmission to recover uplink synchronization and/or to request an uplink resource.

In FIG. 4, the time-out period corresponds to the time during which a user device is maintained in uplink synchronization, although it does not have (nor need) any uplink resource grant. Increasing the time-out duration, increases the probability that when the user device needs an uplink resource again, the user device is still in an uplink synchronized state where the scheduling request is more efficient compared to the non-synchronized state. Also, increasing the time-out duration, increases the number of user devices maintained in the synchronized state. Therefore, the time-out may be adjusted dynamically as a function of the number of uplink synchronized user devices.

In addition, the user devices in the uplink synchronized state are classified into two groups: a "time-critical group" and a "non-time-critical group". The groupings can be based on information (e.g., a QoS requirement) provided with resource requests. A lack of information could also determine which group (e.g., the default group when insufficient information is provided could be the non-time-critical group). The time-critical group uses a longer time-out than the non-time-critical group. The time-out of the non-time-critical group may simply correspond to the time after which the user device is considered non-synchronized (if its synchronization has not been maintained). In this case, in absence of an uplink scheduling grant, the uplink synchronization of non-time-critical user devices is not maintained.

In at least some embodiments, user devices may be reassigned from the time-critical group to the non-time-critical group and vice versa. For example, a given user device in the time-critical group could be reassigned to the non-time-critical group if its QoS requirement has decreased. Meanwhile, a given user device in the non-time-critical group could be reassigned to the time-critical group if its QoS requirement has increased.

The timer used to determine if a time-out occurs can run from the last uplink transmission or from the last received timing adjustment (TA). In the latter case, the base-station has more flexibility in controlling the duration of the period of time during which the user device without uplink grant is maintained in uplink synchronization. This is because the base-station can maintain the TA's transmission for the desired duration and the user device does not need to know when the TA transmission will stop. In this case, the base-station can control alone the difference of time during which time-critical and non-time-critical uplink synchronized user devices without uplink scheduling grant are maintained in the uplink synchronization state. For example, all uplink synchronized user devices can use the same time-out threshold.

Figure 5:
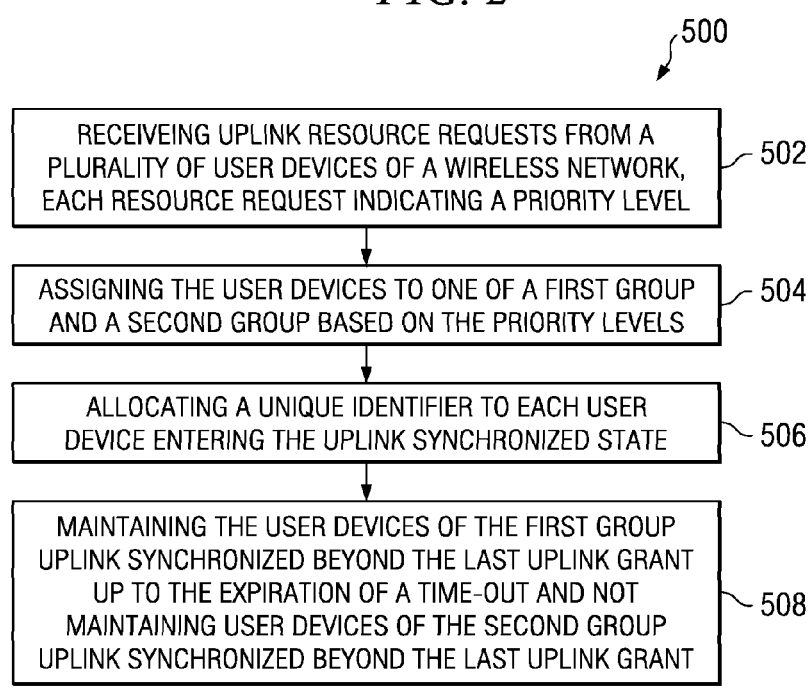
FIG. 5 illustrates a method in accordance with embodiments of the disclosure.

FIG. 5 illustrates a method 500 in accordance with embodiments. As shown in FIG. 5, the method 500 comprises receiving uplink resource requests from a plurality of user devices of a wireless network, each resource request indicating a priority level (block 502). Alternatively, some but not all of the resource request may indicate a priority level. At block 504, the user devices are assigned to one of a first group and a second group based on the priority levels. In some embodiments, the priority levels distinguish between time-critical and non-time critical uplink transmissions. At block 506, a unique identifier is allocated to each user device entering the uplink synchronized state (e.g., in the NSRA response). At block 508, the method 500 comprises maintaining the user devices of the first group uplink synchronized beyond the last (preceding) uplink grant up to the expiration of a time-out and not maintaining user devices of the second group uplink synchronized beyond the last (preceding) uplink grant.

Dividing user devices into groups enables use of a unique identifier having a reduced number of bits (e.g., 9-11 instead of 16). Thus, in some embodiments, the method 500 may also comprise selecting a size of the first and second groups to reduce a number of bits used for the unique identifiers. Furthermore, the method 500 may comprise steps such as providing uplink scheduling grants to user devices of the first group in response to new resource requests based on a scheduling request procedure or maintaining synchronization for each user device of the first group without a scheduling grant via at least one of a non-synchronized random access (NSRA) communication channel, a sounding reference signal (SRS), and a scheduling request channel. Furthermore, the method 500 may comprise steps such as reassigning user devices from the second group to the first group based on requests received via at least one of a non-synchronized random access (NSRA) communication channel and a scheduling request channel. Furthermore, the method 500 may comprise steps such as broadcasting a synchronization time-out period to the user devices.

In at least some embodiments, a wireless networking system is provided. The wireless networking system includes a base-station and a plurality of user devices in communication with the base-station. The base-station selectively assigns each user device to one of a first group and a second group. If a user device of the first group has no scheduling grant, the base-station maintains its uplink synchronization within the range of a timer configured with respect to the base-station capacity in number of uplink synchronized user devices. If a user device of the second group has no scheduling grant, the base-station does not maintain its uplink synchronization. The base-station allocates a unique reduced identifier to each user device entering the uplink synchronization state, which corresponds to a physical resource of the scheduling request channel.

In at least some embodiments, the base-station maintains the user devices of the first group in uplink synchronization even during periods of time where a user device has no uplink grant, up to a certain time out. The base-station does not maintain the uplink synchronization of the user devices in the second group, if they have no uplink grant. The base-station allocates a unique identifier to each user device entering the uplink synchronization state, which allows the user device to send scheduling requests in a contention-free manner.

In at least some embodiments, a method is provided. The method comprises receiving uplink scheduling requests from a plurality of user devices of a wireless network, each scheduling request indicating a priority level. The method further comprises assigning the user devices to one of a first group and a second group based on the priority levels. The method further comprises allocating a long synchronization time-out to each user device of the first group and allocating a shorter synchronization time-out to user devices of the second group.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascer-

What is claimed is:

1. A wireless networking system, comprising:
a base-station;
a plurality of user devices in communication with the base-station;
wherein the base-station selectively assigns each user device to one of an uplink synchronized state and an uplink non-synchronized state; and
wherein the base-station allocates a unique reduced identifier to each user device in the uplink synchronized state for requesting resources in a contention-free manner, but does not allocate unique reduced identifiers to user devices in the non-synchronized state.

2. The wireless networking system of claim 1 wherein a number of bits used for each unique reduced identifier is less than 16-bits.

3. The wireless networking system of claim 1 wherein a one-to-one mapping exists between each reduced identifier and a physical resource of a contention-free scheduling request channel.

4. The wireless networking system of claim 1 wherein the base-station assigns user devices requesting time-critical communications to an uplink synchronized state and assigns all other user devices to an uplink non-synchronized state.

5. The wireless networking system of claim 1 wherein each user device provides a Quality of Service (QoS) requirement to the base-station and wherein the base-station assigns each user device to one of the uplink synchronized state and the uplink non-synchronized state based on the QoS requirement.

6. The wireless networking system of claim 1 wherein the base-station provides uplink scheduling grants to user devices in the uplink synchronized state in response to new resource requests using a contention-free scheduling request channel.

7. The wireless networking system of claim 1 wherein the base station maintains synchronization for each user device with a scheduling grant based on ongoing uplink transmissions via a communication channel shared by user devices.

8. The wireless networking system of claim 1 wherein a given user device switches from the uplink non-synchronized state to the uplink synchronized state based on requests received via a non-synchronized random access (NSRA) channel.

9. The wireless networking system of claim 1 wherein the base-station broadcasts a synchronization time-out period to the user devices.

10. The wireless networking system of claim 1 wherein the base-station explicitly allocates a unique reduced identifier to each user device entering the uplink synchronized state.

11. The wireless networking system of claim 1 wherein the base-station implicitly allocates a unique reduced identifier to each user device entering the uplink synchronized state.

12. A wireless networking system, comprising:
a base-station;
a plurality of user devices in communication with the base-station;
wherein the base-station selectively assigns each user device to one of an uplink synchronized state and an uplink non-synchronized state;
wherein the base-station allocates a unique reduced identifier to each user device in the uplink synchronized state for requesting resources in a contention-free manner, but does not allocate unique reduced identifiers to user devices in the non-synchronized state; and
wherein a number of bits used for each unique reduced identifier is selected based on a maximum number of uplink synchronized user devices to be supported by the base-station.

13. A method, comprising:
receiving uplink resource requests from a plurality of user devices of a wireless network, each of the resource requests indicating a priority level;
assigning the user devices to one of an uplink synchronized state and an uplink non-synchronized state based on the priority levels;
managing uplink synchronization states of the user devices based on timers that track an amount of time that passes since at least one of a preceding uplink transmission and a preceding received timing adjustment command and based on scheduling requests received via a non-synchronized random access (NSRA) channel; and
allocating a unique reduced identifier to each user device of the uplink synchronized state for requesting resources in a contention-free manner, but not to user devices of the uplink non-synchronized state.

14. The method of claim 13 further comprising selecting a size of the uplink synchronized and uplink non-synchronized states to reduce a number of bits used for the unique reduced identifiers.

15. The method of claim 13 further comprising providing a one-to-one mapping between each reduced identifier and a physical resource of a scheduling request channel.

16. The method of claim 13 further comprising providing uplink scheduling grants to uplink synchronized user devices in response to new resource requests received via a contention-free scheduling request channel.

17. The method of claim 13 further comprising reassigning user devices from the non-synchronized state to the synchronized state based on requests received via the NSRA channel.

18. The method of claim 13 further comprising broadcasting a synchronization time-out period to the user devices.

19. The method of claim 13 wherein a number of bits used for each unique reduced identifier is less than 16-bits.

20. The method of claim 13 wherein user devices requesting time-critical communications are assigned to an uplink synchronized state and all other user devices are assigned to an uplink non-synchronized state.

21. The method of claim 13 wherein each user device provides a Quality of Service (QoS) requirement and wherein each user device is assigned to one of the uplink synchronized state and the uplink non-synchronized state based on the QoS requirement.

22. The method of claim 13 wherein synchronization for each user device with a scheduling grant is maintained based on ongoing uplink transmissions via a communication channel shared by user devices.

23. A method, comprising:
receiving uplink resource requests from a plurality of user devices of a wireless network, each of the resource requests indicating a priority level;
assigning the user devices to one of an uplink synchronized state and an uplink non-synchronized state based on the priority levels;
managing uplink synchronization states of the user devices based on timers that track an amount of time that passes since at least one of a preceding uplink transmission and a preceding received timing adjustment command and based on scheduling requests received via a non-synchronized random access (NSRA) channel; and allocating a unique reduced identifier to each user device of the uplink synchronized state for requesting resources in a contention-free manner, but not to user devices of the uplink non-synchronized state, wherein a number of bits used for each unique reduced identifier is selected based on a maximum number of uplink synchronized user devices to be supported.

* * * * *